(12) United States Patent
Nakadai

(10) Patent No.: US 12,067,506 B2
(45) Date of Patent: Aug. 20, 2024

(54) PATH ADJUSTMENT SYSTEM, PATH ADJUSTMENT DEVICE, PATH ADJUSTMENT METHOD, AND PATH ADJUSTMENT PROGRAM

(71) Applicant: NEC Corporation, Tokyo (JP)

(72) Inventor: Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 17/618,055

(22) PCT Filed: Jun. 18, 2020

(86) PCT No.: PCT/JP2020/023921
§ 371 (c)(1),
(2) Date: Dec. 10, 2021

(87) PCT Pub. No.: WO2020/256054
PCT Pub. Date: Dec. 24, 2020

(65) Prior Publication Data
US 2022/0309410 A1     Sep. 29, 2022

Related U.S. Application Data

(60) Provisional application No. 62/863,562, filed on Jun. 19, 2019.

(51) Int. Cl.
*G06Q 10/047* (2023.01)
*G06N 20/00* (2019.01)
(Continued)

(52) U.S. Cl.
CPC ........... *G06Q 10/047* (2013.01); *G06N 20/00* (2019.01); *G08G 5/0026* (2013.01);
(Continued)

(58) Field of Classification Search
CPC .... G06Q 10/047; G06N 20/00; G08G 5/0026; G08G 5/0039; G08G 5/0043; G08G 5/0082; G08G 5/045
(Continued)

(56) References Cited

U.S. PATENT DOCUMENTS 11,144,057 B1 * 10/2021 Ebrahimi Afrouzi ........................ G05D 1/0231
2010/0114633 A1 * 5/2010 Sislak .................... G08G 5/045 701/120
(Continued)

FOREIGN PATENT DOCUMENTS

| JP | 2009-251729 A | 10/2009 |
| JP | 2018-073360 A | 5/2018 |

OTHER PUBLICATIONS

International Search Report for PCT Application No. PCT/JP2020/023921, mailed on Sep. 24, 2020.
English translation of Written opinion for PCT Application No. PCT/JP2020/023921, mailed on Sep. 24, 2020.
(Continued)

*Primary Examiner* — Yazan A Soofi
(74) *Attorney, Agent, or Firm* — Sughrue Mion, PLLC

(57) ABSTRACT

A path reception means 81 receives path evaluation data including each of paths of a plurality of moving bodies and an evaluation value of a business operator for each of the paths. A multi-path optimization means 82 performs optimization based on a utility function that represents adequacy of a business operator for a path learned based on the path evaluation data such that a number of the moving bodies existing in an identical area is a predetermined number or less and determines each of the paths of the plurality of moving bodies to adjust the paths of the plurality of moving bodies. A path transmission means 83 transmits each optimized path.

12 Claims, 9 Drawing Sheets

(51) Int. Cl.
*G08G 5/00* (2006.01)
*G08G 5/04* (2006.01)

(52) U.S. Cl.
CPC ......... *G08G 5/0039* (2013.01); *G08G 5/0043* (2013.01); *G08G 5/0082* (2013.01); *G08G 5/045* (2013.01)

(58) Field of Classification Search
USPC .......................................................... 701/120
See application file for complete search history.

(56) References Cited

U.S. PATENT DOCUMENTS

| | | | | |
|---|---|---|---|---|
| 2010/0235285 | A1* | 9/2010 | Hoffberg | G06Q 50/188 705/37 |
| 2018/0225581 | A1* | 8/2018 | Oyamada | G06F 16/285 |
| 2019/0012573 | A1* | 1/2019 | Oyamada | G06N 20/10 |
| 2019/0304069 | A1* | 10/2019 | Vogels | G06N 5/046 |
| 2019/0361483 | A1* | 11/2019 | Nakadai | G06F 1/025 |
| 2021/0027204 | A1* | 1/2021 | Zhang | G06N 20/10 |

OTHER PUBLICATIONS

Ofra Amir et al, "Multi-Agent Pathfinding as a Combinatorial Auction", AAAI2015, Jan. 2015, pp. 1-7.

Gianluca Brero et al, "Probably Approximately Efficient Combinatorial Auctions via Machine Learning", In Proceedings of the 31st AAAI Conference of Artificial Intelligence, 2017, pp. 397-405.

Eli Boyarski et al, "ICBS: improved conflict-based search algorithm for multi-agent pathfinding", Proceedings of the Twenty-Fourth International Joint Conference on Artificial Intelligence (IJCAI 2015), pp. 740-746.

Hiroshi Shimodaira et. al, "Dynamic Time-Alignment Kernel in Support Vector Machine", NIPS 02, Apr. 2002, pp. 1-9.

Marco Cuturi, "Fast Global Alignment Kernels", Conference: Proceedings of the 28th International Conference on Machine Learning, ICML 2011, Bellevue, Washington, USA, Jun. 2011, pp. 1-8.

Otsuka Takuma et al., "Bayesian Optimization for Crowd Traffic Control Using Multi-Agent Simulation", 2019 IEEE Intelligent Transportation Systems Conference (ITSC), pp. 1-16, Oct. 27, 2019, [retrieved on Sep. 8, 2020], Retrieved from the Internet: <URL:https://ieeexplore.ieee.org/stamp/stamp.jsp?tp=&arnumber=8917496>.

* cited by examiner

Budles:

$b_{1,1} = \{A_0, B_1\}$ $b_{1,2} = \{A_0, A_1, B_2\}$ $b_{2,1} = \{C_0, B_1, D_2\}$

Valuations:

$b_{1,1} = 2 \times 2 - 1 = 3$ $b_{1,2} = 2 \times 2 - 2 = 2$ $b_{2,1} = 2 \times 2 - 2 = 2$

SIMILAR PATH original path $(v^0, \ldots, v^t, \ldots, v^{\bar{t}})$

⬇ shift: $(\ldots, v^{t-1}, v^t, v^t, v^{t+1}, \ldots)$ swap: $(\ldots, v^{t-1}, v', v^{t+1}, \ldots), v' \neq v^t$ prune: $(\ldots, v^{t-1}, v^{t+1}, \ldots)$ detour: $(\ldots, v^t, v', v'', v^{t+1}, \ldots)$

PATH ADJUSTMENT SYSTEM, PATH ADJUSTMENT DEVICE, PATH ADJUSTMENT METHOD, AND PATH ADJUSTMENT PROGRAM This application is a National Stage Entry of PCT/JP2020/023921 filed on Jun. 18, 2020, which claims priority from U.S. Patent Application 62/863,562 filed on Jun. 19, 2019, the contents of all of which are incorporated herein by reference, in their entirety.

TECHNICAL FIELD

The present invention relates to a path adjustment system, a path adjustment device, a path adjustment method, and a path adjustment program for adjusting paths of a plurality of moving bodies.

BACKGROUND ART

A technology for determining paths of a plurality of moving bodies without collision is called multi agent pathfinding (MAPF), and typical algorithms thereof include Cooporative A*, conflict-based search (CBS), increasing cost tree search (ICTS), and improved conflict-based search (ICBS). These are algorithms that mainly determine paths such that the paths do not conflict with each other when the same administrator manages a plurality of moving bodies. In addition, these algorithms operate so as to shorten a distance between set start point and end point at the time of determining the path. That is, many MAPF algorithms use a utility function that considers a centralized type and a moving distance. Here, the utility function is a function in which an administrator returns a value indicating how desirable a given path is.

On the other hand, when operating a drone, a car or the like, there are many situations in which different administrators determine paths, and it is impossible to make a centralized determination. In addition, the shortest path is not always desirable for a drone for aerial photography or the like, and a utility function in which it is desired to stay in a certain space-time is used. There is a practical demand for MAPF that can realize the arbitrariness of the utility function while realizing such dispersibility. NPL 1 describes an example of MAPF that can realize these dispersibility and arbitrariness.

Note that NPL 2 describes an efficient combinatorial auction by machine learning, and NPL 3 describes CBS. In addition, NPL 4 and NPL 5 respectively describe kernel functions of time-series data.

CITATION LIST

Non Patent Literature

[NPL 1]
O Amir, G Sharon, R Stern, "Multi-Agent Pathfinding as a Combinatorial Auction", AAAI2015, January, 2015.
[NPL 2]
Gianluca Brero, Benjamin Lubin, Sven Seuken, "Probably Approximately Efficient Combinatorial Auctions via Machine Learning", In Proceedings of the 31st AAAI Conference of Artificial Intelligence, pp. 397-405, 2017.
[NPL 3]
Boyarski E, Felner. A, Stern R, Sharon G, Tolpin D, Betzalel O, Shimony S, "ICBS: improved conflict-based search algorithm for multi-agent pathfinding", IJCAI2015.
[NPL 4]
Shimodaira et. al, "Dynamic Time-Alignment Kernel in Support Vector Machine", NIPS 02, April 2002.
[NPL 5]
Marco Cuturi, "Fast Global Alignment Kernels", Conference: Proceedings of the 28th International Conference on Machine Learning, ICML 2011, Bellevue, Washington, USA, June 2011.

SUMMARY OF INVENTION

Technical Problem

A path adjustment system described in NPL 1 includes: a space price storage unit that manages the price of each space; a space bidding means for calculating and declaring a space constituting a path to be used and its value; and a space allocation means.

Specifically, in the path adjustment system described in NPL 1, the space bidding means of each moving body calculates a path to be used, calculates its value, and bids. In addition, the space allocation means determines a moving body to which each space is to be allocated based on bid values obtained from the plurality of moving bodies, and values used for the determination are stored in the space price storage unit. The bid by the space bidding means is executed again using this price.

As a result of such a repetition, the path allocation is determined. That is, with such a configuration, even if there are different administrators of moving bodies, it is possible to dispersively determine paths that do not collide, and it is possible to reflect arbitrary utility with respect to space-time.

However, the system described in NPL 1 has a problem that the amount of data that needs to be declared by the administrators of the respective moving bodies is large and it is necessary to transmit data many times. A reason thereof is that the path is modeled as a combination of the space, and the number of required combinations increases exponentially if an evaluation value is given for each different combination. In addition, such a mechanism increases the number of spaces that need to be sent at once whenever a path length increases.

Further, the system described in NPL 1 also has a problem that the administrators of the respective moving bodies need to generate the path while considering the price of the space-time to be used.

Therefore, the present invention aims to provide a path adjustment system, a path adjustment device, a path adjustment method, and a path adjustment program which can provide a path that is highly convenient for an administrator so as not to collide with other moving bodies while reducing the amount of data that the administrator needs to declare for paths of moving bodies.

Solution to Problem

The path adjustment device according to the present invention includes: a path reception means for receiving path evaluation data including each of paths of a plurality of moving bodies and evaluation values of business operators for each of the paths; a multi-path optimization means for performing optimization based on a utility function that represents adequacy of a business operator for a path learned based on the path evaluation data such that a number of the moving bodies existing in an identical area is a predetermined number or less and determining each of the paths of the plurality of moving bodies to adjust the paths of the plurality of moving bodies; and a path transmission means for transmitting each optimized path.

A path adjustment system according to the present invention includes: a path adjustment device that adjusts paths of a plurality of moving bodies; and one or more business operator terminals. The path adjustment device includes: a path reception means for receiving path evaluation data including each of paths of the moving bodies and evaluation values of business operators for each of the paths from the business operator terminals; a multi-path optimization means for performing optimization based on a utility function that represents adequacy of a business operator for a path learned based on the path evaluation data such that a number of the moving bodies existing in an identical area is a predetermined number or less and determining each of the paths of the plurality of moving bodies; and a path transmission means for transmitting an optimized path to each of the business operator terminals.

A path adjustment method according to the present invention includes: receiving path evaluation data including each of paths of a plurality of moving bodies and evaluation values of business operators for each of the paths; performing optimization based on a utility function that represents adequacy of a business operator for a path learned based on the path evaluation data such that a number of the moving bodies existing in an identical area is a predetermined number or less and determining each of the paths of the plurality of moving bodies to adjust the paths of the plurality of moving bodies; and transmitting each optimized path.

A path adjustment program according to the present invention causes a computer to execute: a path reception process of receiving path evaluation data including each of paths of a plurality of moving bodies and evaluation values of business operators for each of the paths; a multi-path optimization process of performing optimization based on a utility function that represents adequacy of a business operator for a path learned based on the path evaluation data such that a number of the moving bodies existing in an identical area is a predetermined number or less and determining each of the paths of the plurality of moving bodies to adjust the paths of the plurality of moving bodies; and a path transmission process of transmitting each optimized path.

Advantageous Effects of Invention

According to the present invention, the path that is highly convenient for the administrator can be provided so as not to collide with other moving bodies while reducing the amount of data that the administrator needs to declare for the paths of the moving bodies.

DESCRIPTION OF EMBODIMENTS

Hereinafter, exemplary embodiments of the present invention will be described with reference to the accompanying drawings.

Figure 1:
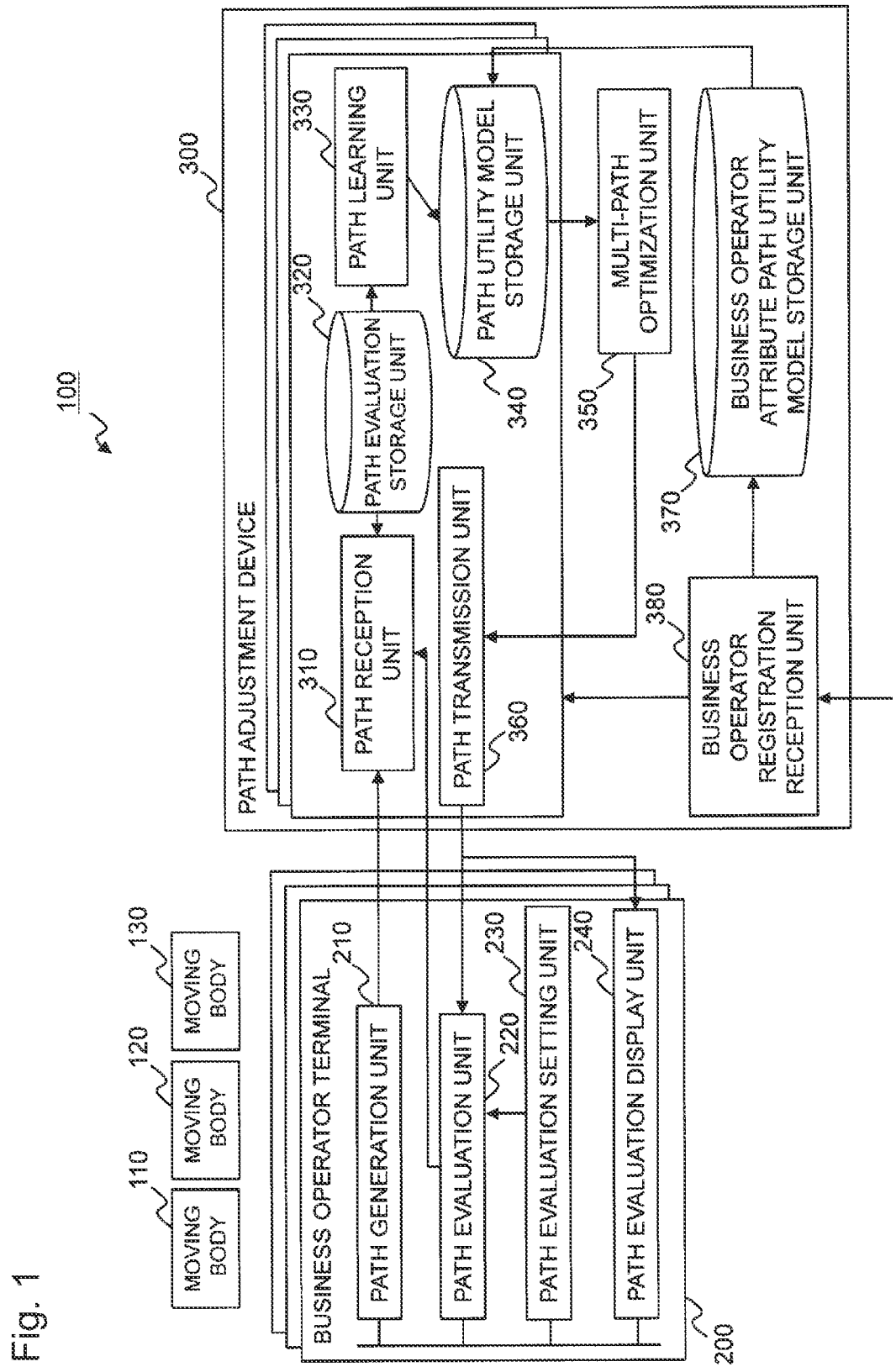
FIG. 1
It depicts a block diagram illustrating a configuration of a first exemplary embodiment of a path adjustment system according to the present invention.

FIG. 1 is a block diagram illustrating a configuration of a first exemplary embodiment of a path adjustment system according to the present invention. A path adjustment system 100 of the present exemplary embodiment includes a business operator terminal 200 and a path adjustment device 300. Note that the unidirectional arrow illustrated in FIG. 1 simply indicates a direction of information flow, and does not exclude bidirectionality.

The business operator terminal 200 is a terminal operated by a business operator that manages each of moving bodies 110 to 130 moving in a moving area, and is connected to the path adjustment device 300 via a communication line. Examples of the moving body include a drone and the like. Note that a business operator is also sometimes referred to as an administrator in the following description.

Each business operator may manage only one moving body or a plurality of moving bodies. In addition, the three moving bodies (moving bodies 110 to 130) are illustrated in the example illustrated in FIG. 1, but the number of moving bodies managed by the path adjustment system is not limited to three, and may be two or four or more.

The business operator terminal 200 includes a path generation unit 210, a path evaluation unit 220, a path evaluation setting unit 230, and a path evaluation display unit 240. Note that FIG. 1 illustrates the three business operator terminals 200, but the number of the business operator terminals 200 is not limited to three, and may be one or two, or four or more.

The path generation unit 210 generates data (hereinafter, referred to as path evaluation data) including a path of a moving body and an evaluation value of a business operator for the path, and transmits the data to the path adjustment device 300. Note that a case where evaluation is performed from the viewpoint of the business operator will be described here, but the viewpoint of evaluation is not limited to the business operator, and may be, for example, an administrator or an operator.

A method by which the path generation unit 210 generates the path evaluation data is arbitrary. For example, the path generation unit 210 may generate the path evaluation data including the path and the evaluation value based on an instruction from the administrator or may generate the path evaluation data based on past history data.

In particular, it suffices that the path evaluation data used in the present exemplary embodiment includes the path and the evaluation value, which is different from data that needs to be declared by a declarer as described in NPL 1 described above. Therefore, it is possible to reduce the amount of data that needs to be declared by the administrator.

Note that configurations of the path evaluation unit 220, the path evaluation setting unit 230, and the path evaluation display unit 240 will be described below.

The path adjustment device 300 is a device that adjusts paths of a plurality of moving bodies. The path adjustment device 300 of the present exemplary embodiment includes a path reception unit 310, a path evaluation storage unit 320, a path learning unit 330, a path utility model storage unit 340, a multi-path optimization unit 350, a path transmission unit 360, a business operator attribute path utility model storage unit 370, and a business operator registration reception unit 380. Note that the path reception unit 310, the path evaluation storage unit 320, the path learning unit 330, the path utility model storage unit 340, and the path transmission unit 360 may be provided for each business operator as illustrated in FIG. 1.

The path reception unit 310 receives path evaluation data from the path generation unit 210. In addition, the path reception unit 310 may also receive path evaluation data from the path evaluation unit 220 to be described below. Then, the path reception unit 310 stores the received path evaluation data in the path evaluation storage unit 320.

The path evaluation storage unit 320 stores path evaluation data for each moving body. The path evaluation storage unit 320 may store not only the path evaluation data received by the path reception unit 310 but also path evaluation data generated in advance. The path evaluation storage unit 320 is implemented using, for example, a magnetic disk or the like.

The path learning unit 330 uses the path evaluation data stored in the path evaluation storage unit 320 as learning data to perform regression learning of a utility function for each moving body. As described above, this utility function is a function that is learned based on the path evaluation data, and can be said to be a function that represents the adequacy of a business operator for a path.

A method by which the path learning unit 330 learns the utility function is arbitrary. The path learning unit 330 may learn the utility function by support vector regression (SVR). In addition, the path learning unit 330 may regress the utility function in a Gaussian process.

In addition, the path learning unit 330 may learn the utility function using, for example, a kernel function that evaluates the closeness of one path to another path. Note that two types, for example, a space and a path, can be assumed as variables used for the kernel function.

When the path is assumed as a variable, a cumulative value of kernels along with the optimal arrangement may be used, for example, as in dynamic time-alignment kernel described in NPL 4. In addition, a cumulative value of kernels along all alignments may be used as in the global alignment kernel described in NPL 5.

Note that the path learning unit 330 may learn a utility function in a mode suitable for an optimization process performed by the multi-path optimization unit 350 to be described below. The path learning unit 330 stores the learned utility function in the path utility model storage unit 340.

The path utility model storage unit 340 stores a utility function for each moving body. The path utility model storage unit 340 may store not only the utility function learned by the path learning unit 330 but also a utility function machine-learned in advance by another device (not illustrated). In addition, the path utility model storage unit 340 may acquire and store a utility function of a corresponding business operator from among utility functions stored in the business operator attribute path utility model storage unit 370 to be described below. The path utility model storage unit 340 is implemented using, for example, a magnetic disk or the like.

The multi-path optimization unit 350 determines paths of a plurality of moving bodies based on the utility function stored in the path utility model storage unit 340. Specifically, the multi-path optimization unit 350 performs optimization based on the utility function such that the number of moving bodies existing in the identical area is a predetermined number or less (that is, do not collide), and determines each of paths of the plurality of moving bodies. The predetermined number is one, for example.

Figure 2:
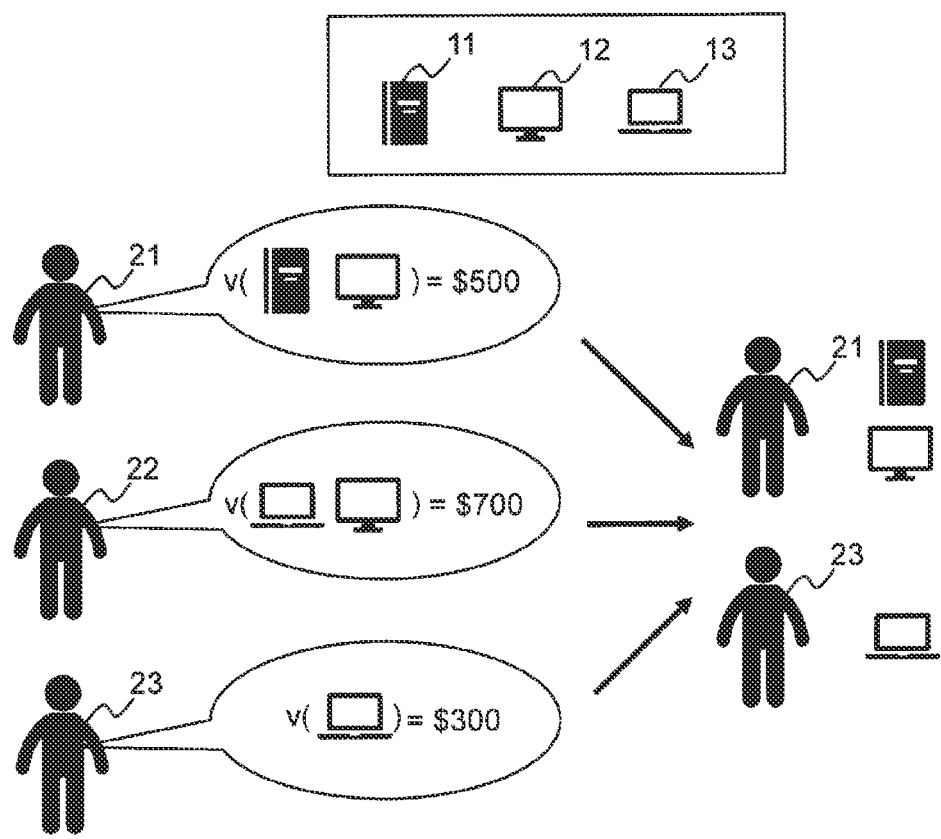
FIG. 2
It depicts an explanatory diagram illustrating an example of a combinatorial auction.

Hereinafter, a method by which the multi-path optimization unit 350 of the present exemplary embodiment performs the optimization process will be specifically described. First, a combinatorial auction (CA), which is a type of optimization problem, will be described. FIG. 2 is an explanatory diagram illustrating an example of the combinatorial auction. In the combinatorial auction, a buyer i desires a set $s_i$ of products and declares a value $v_i$ of the set $s_i$.

In the example illustrated in FIG. 2, products 11 to 13 are simultaneously sold. This case illustrates an example in which a buyer 21 declares a set of the product 11 and the product 12 as $500, a buyer 22 declares a set of the product 13 and the product 12 as $700, and a buyer 23 declares the product 13 as $300. In this case, it is determined that it is optimal to sell the products to the buyer 21 and the buyer 23, respectively.

The combinatorial auction is an NP-hard set packing problem and a winner determination algorithm is used. When this problem is applied to MAPF, products correspond to space-time and a bundle (set of products) corresponds to a path.

Figure 3:
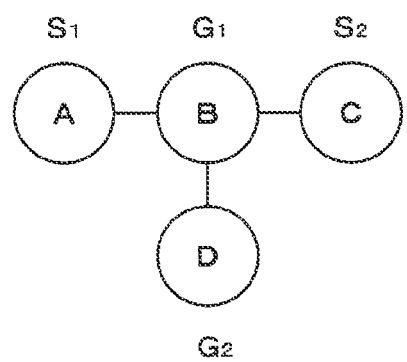
FIG. 3
It depicts an explanatory diagram illustrating an example in which the combinatorial auction is applied to MAPF.

FIG. 3 is an explanatory diagram illustrating an example in which the combinatorial auction is applied to MAPF. In the example illustrated in FIG. 3, spaces A to D are assumed, and the space A is a start of Agent 1, the space B is a goal of Agent 1, the space C is a start of Agent 2, and the space D is a goal of Agent 2.

In addition, two types of candidates $b_{1,1}=\{A_0, B_1\}$ and $b_{1,2}=\{A_0, A_1, B_2\}$ are assumed as a path of Agent 1 corresponding to a bundle, and a candidate $b_{2,1}=\{C_0, B_1, D_2\}$ is assumed as a path of Agent 2. It is illustrated that the candidate $b_{1,1}=\{A_0, B_1\}$ exists in A at t=0 and in B at t=1. In addition, it is illustrated that the candidate $b_{1,2}=\{A_0, A_1, B_2\}$ exists in A at t=0, continues to stay in A at t=1, and exists in B at t=2.

In addition, FIG. 3 illustrates an example in which $b_{1,1}=3$, $b_{1,2}=2$, and $b_{2,1}=2$ are calculated for the evaluation of each path candidate. For example, when comparing the candidate $b_{1,1}$ and the candidate $b_{1,2}$, it is illustrated that the candidate $b_{1,2}$ stayed at the same place for a certain period of time so that it took a longer moving time, and as a result, evaluation was calculated to be low.

Note that the number of possible combinations of paths is suppressed in a closed space such as a factory, but there are many possible combinations of paths and no scaling is performed in the case of an open space such as an air space.

Hereinafter, as a first optimization method, an optimization method based on a combinatorial auction using machine learning (ML) (hereinafter, also referred to as CA-ML) will be described. In the first optimization method, SVR is assumed as a learning model.

Figure 4:
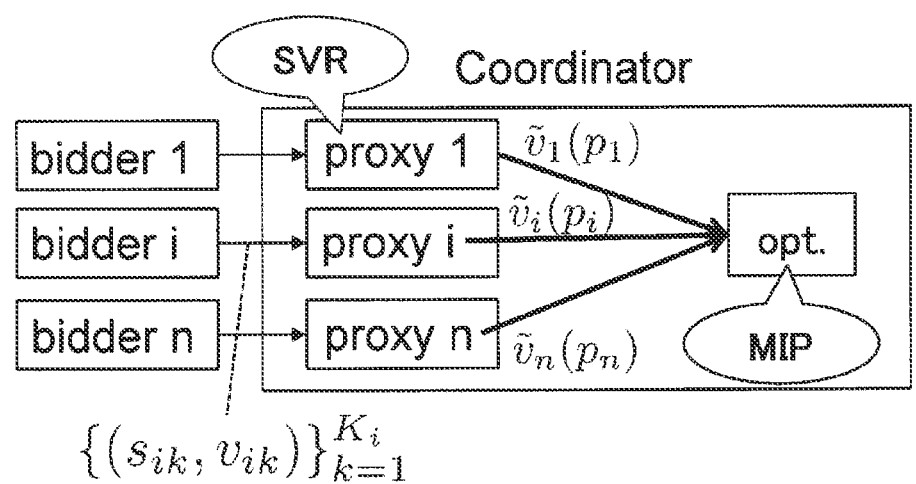
FIG. 4
It depicts an explanatory diagram illustrating an example of a first optimization method.

FIG. 4 is an explanatory diagram illustrating an example of the first optimization method. In this method, the business operator terminal 200 (specifically, the path generation unit 210), which is each bidder i (Bidder), transmits a plurality of pieces of data $\{(s_{ik}, v_{ik})\}^{Ki}_{k=1}$ including a desired path $s_{ik}$ and its value $v_{ik}$ (that is, path evaluation data) to the path adjustment device 300 which is a coordinator (more specifically, the path learning unit 330 which is a proxy).

The path learning unit 330 performs learning based on the received path evaluation data and generates a utility function. As described above, the path learning unit 330 regresses the utility function in SVR in the first optimization method. Then, the multi-path optimization unit 350 estimates and maximizes a value of the path using the utility function, and allocates space-time that is the path.

Specifically, the multi-path optimization unit 350 performs optimization so as to maximize the sum of utility functions $\tilde{v}$ (superscript tilde of v) for a path $p_i$ of each moving body i as illustrated in the following Formula 1.

[Math. 1]

$$\max_{\{p_i\}_{i=1}^{n}} \sum_{i=1}^{n} \tilde{v}_i(p_i) \quad \text{(Formula 1)}$$

The multi-path optimization unit 350 may model the optimization in the first optimization method as mixed integer programming problems (MIP). Specifically, the multi-path optimization unit 350 may represent a path of a moving body as a set of use or non-use of small areas in space-time, causes the use or non-use of the small areas to result in the mixed integer programming problems to determine space-time to be used by each moving body. The use or non-use of the small area can be represented by one in the case of being used or zero in the case of being not used. Specifically, the utility function in Formula 1 may be modeled as Formula 2 illustrated as follows as described in NPL 2.

[Math. 2]

$$\sum_{k=1}^{K_i} \alpha_{ik} k(p_i, s_{ik}) \quad \text{(Formula 2)}$$

Note that a prediction result obtained using the first optimization method is favorable, but no scaling is performed with respect to the size of space-time.

Next, a second optimization method will be described. The case where MIP used for general problems is used for optimization has been illustrated in the first optimization method. As a second optimization method, a method of using CBS as optimization specialized for MAPF will be described hereinafter. Even in the second optimization method, SVR is assumed as a learning model. That is, the second optimization method uses machine learning (ML), but it can be said that the MIP in the first optimization method is replaced with CBS in this method.

CBS is an optimal and complete method, but no scaling is performed (see NPL 3). Note that enhanced CBS (ECBS) that performs scaling may be used instead of CBS.

CBS is a two-level (a high-level and a low-level) algorithm. In the high-level hierarchy, a search is executed in a tree (conflict tree (CT)) based on a conflict between individual agents. Each node in CT represents a set of constraints on movement of an agent. Specifically, each node contains time and location constraints (an agent number, a node, and time) of a single agent.

Figure 5:
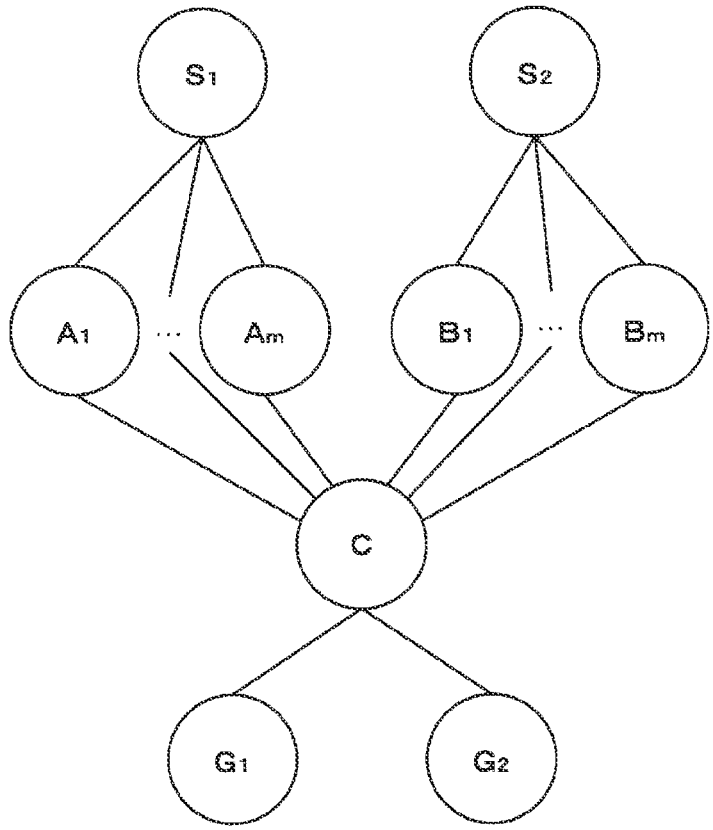
FIG. 5
It depicts an explanatory diagram illustrating an example of an MAPF instance.

FIG. 5 is an explanatory diagram illustrating an example of an MAPF instance. CT illustrated in FIG. 5 illustrates an example of the MAPF instance having two agents. In the example illustrated in FIG. 5, the respective agents need to reach $G_1$ from $S_1$, and $G_2$ from $S_2$, respectively.

Both the agents have individual paths each having a length of 3 which are $<S_1, A_1, C, G_1>$ and $<S_2, B_1, C, G_2>$, respectively. However, these paths both contain state C at time $t_2$, and thus, conflict with each other. Therefore, one of these agents needs to stand by temporarily.

Figure 6:
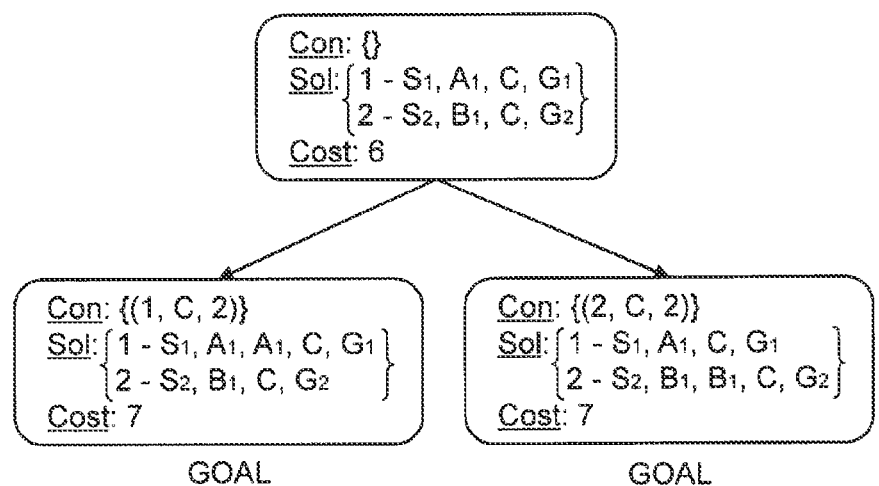
FIG. 6
It depicts an explanatory diagram illustrating an example of CT.

FIG. 6 is an explanatory diagram illustrating an example of CT. CT illustrated in FIG. 6 corresponds to the MAPF instance illustrated in FIG. 5. "Con" of CT illustrated in FIG. 6 indicates a collision, and "Sol" indicates an optimization result. In the case of the example illustrated in FIG. 5, cost ("Cost") of an optimal solution is calculated as seven.

In the low-level hierarchy, an optimal path for each agent is searched while satisfying the constraints imposed by the CT node at the high-level. Note that the multi-path optimization unit 350 performs optimization (search) using a utility function in the present exemplary embodiment, instead of searching for the optimal path for each agent.

The second optimization method will be described hereinafter using a specific example. As described above, the multi-path optimization unit 350 manages information on a tree structure having a collision between a plurality of moving bodies as a node. Specifically, the multi-path optimization unit 350 manages a tree structure (CT) including the collision (conflict) between the plurality of moving bodies in the node as illustrated in FIG. 6 as the constraint on the path of the moving body. Then, the multi-path optimization unit 350 generates a path that maximizes a utility function at the time of generating a new path of a moving body at a node in this tree structure.

Figure 7:
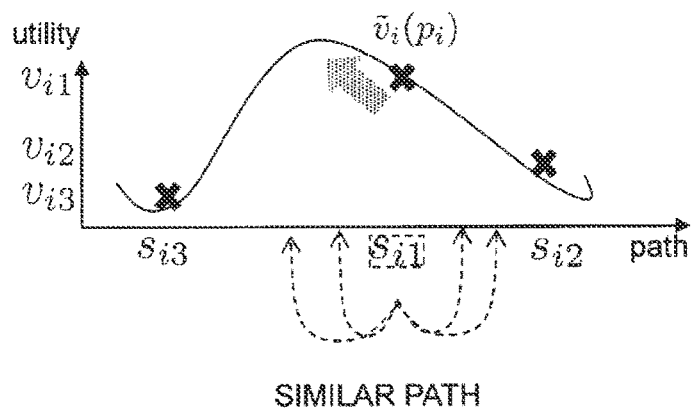
FIG. 7
It depicts an explanatory diagram illustrating an example of processing for generating a path.

FIG. 7 is an explanatory diagram illustrating an example of processing for generating a path. The multi-path optimization unit 350 calculates a value of a utility function in a path $s_{i1}$ illustrated in FIG. 7, for example, to obtain $v_{i1}$. Next, the multi-path optimization unit 350 adds a path similar to the path $s_{i1}$ to a set of path candidates based on the tree structure. Note that a method of generating the similar path is arbitrary.

Figure 8:
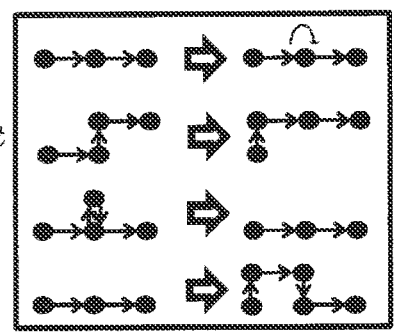
FIG. 8
It depicts an explanatory diagram illustrating examples of a similar path.

FIG. 8 is an explanatory diagram illustrating examples of the similar path. As illustrated in FIG. 8, the multi-path optimization unit 350 may generate the similar path by performing operations, for example, shifting, swapping, pruning and detouring with respect to an original path. The multi-path optimization unit 350 repeats the process of generating the similar path and calculating the value of the utility function to determine the path having the maximum utility function.

In this manner, the multi-path optimization unit 350 may determine each of the paths of the moving bodies by generating the path of the moving body so as to maximize the utility function based on the tree structure in which the node includes the collision (conflict) between the plurality of moving bodies as the constraint on the path of the moving body.

Note that it has been confirmed that the scaling is performed using the second optimization method. In addition, it is possible to further improve the prediction accuracy by obtaining more preferable path evaluation data (that is, path and evaluation value) from the agent (business operator). In addition, it is possible to obtain a better path by comprehensively performing search at the time of searching for the optimal path.

Next, a third optimization method will be described. In the third optimization method, a method capable of further improving the optimality in the case of using the second optimization method will be described. In the third optimization method, a Gaussian process (GP) is assumed as a learning model instead of SVR. That is, the path learning unit 330 regresses a utility function in the Gaussian process in the third optimization method.

Figure 9:
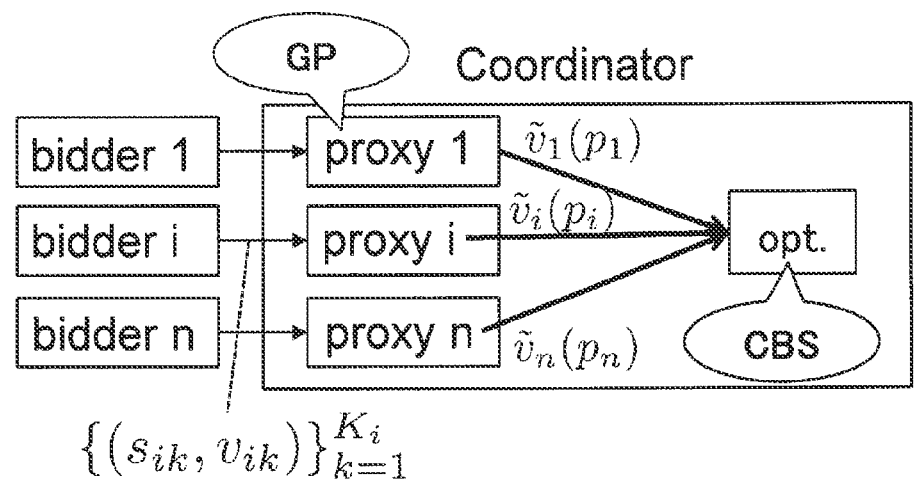
FIG. 9
It depicts an explanatory diagram illustrating an example of a third optimization method.

FIG. 9 is an explanatory diagram illustrating an example of the third optimization method. In this method, the business operator terminal 200 (specifically, the path generation unit 210), which is each bidder i, transmits a plurality of pieces of data $\{(s_{ik}, v_{ik})\}^{Ki}_{k=1}$ including a desired path $s_{ik}$ and its value $v_{ik}$ (that is, path evaluation data) to the path adjustment device 300 which is a coordinator (more specifically, the path learning unit 330 which is a proxy) in the same manner as the first optimization method.

The path learning unit 330 performs learning based on the received path evaluation data and generates a utility function. As described above, the path learning unit 330 regresses the utility function in the Gaussian process in the third optimization method. Then, the multi-path optimization unit 350 estimates and maximizes a value of the path using the utility function, and allocates space-time that is the path.

Note that the method of modeling the optimization as MIP has been described in the first optimization method. In the third optimization method, the optimization is modeled based on CBS used in the second optimization method as illustrated in FIG. 9. Then, the multi-path optimization unit 350 uses a Bayesian optimization method to generate a new path that has not been transmitted to each moving body based on a statistical value (for example, an average value, a variance, entropy, or the like) calculated based on the utility function.

Specifically, the multi-path optimization unit 350 generates a path that maximizes the utility function in the low-level hierarchy in CBS. The multi-path optimization unit 350 may generate a path that maximizes the utility function by generating a similar path, for example, in the same manner as the second optimization method. The generated path is transmitted to the business operator terminal 200, for example, by the path transmission unit 360 to be described below, and the path reception unit 310 receives the path evaluation data in which the evaluation value has been set for the path, and the path learning unit 330 learns the utility function. In this manner, the utility function is updated, and the multi-path optimization unit 350 repeats the optimization process based on the updated utility function.

The path transmission unit 360 transmits the optimized path to each moving body or the business operator terminal 200 that manages each moving body.

The business operator attribute path utility model storage unit 370 stores attribute information representing an attribute of a business operator (administrator) of a moving body or an attribute of a flight plan of the moving body and a utility function of the moving body to be associated with each other. The attribute information and the utility function may be associated with each other, for example, in the form of a correspondence table, or may be associated with each other by discriminative learning or the like. In this manner, the utility function associated with the attribute information can be referred to as an attribute utility function. The business operator attribute path utility model storage unit 370 is implemented using, for example, a magnetic disk or the like.

The business operator registration reception unit 380 acquires an attribute utility function corresponding to a new business operator attribute or flight plan attribute from the business operator attribute path utility model storage unit 370 when a new business operator registers for use or when a new flight plan is made. Thereafter, the path optimization process is performed based on the acquired attribute utility function.

In the business operator terminal 200, the path evaluation display unit 240 displays a path received from the path adjustment device 300 on a screen (path evaluation screen). In addition, the path evaluation display unit 240 may receive input of an evaluation value for the received path from the business operator or the like. In addition, the path evaluation display unit 240 may display a path evaluation result obtained by the path evaluation unit 220 to be described below.

The path evaluation setting unit 230 displays an input/output screen (path evaluation setting input/output screen) to receive the setting of a path evaluation condition. For example, the path evaluation setting unit 230 may receive the input of the path evaluation condition to determine the adequacy, and display the received evaluation condition.

The path evaluation unit 220 evaluates a path of a moving body. Specifically, the path evaluation unit 220 evaluates a path transmitted from the path adjustment device 300. A method for the evaluation is arbitrary. For example, the path evaluation unit 220 may evaluate the adequacy from the viewpoint of a business operator of a path based on data stored in a business system or information specified by a manager of the business operator. In addition, the path evaluation unit 220 may evaluate the path of the moving body based on the path evaluation condition received by the path evaluation setting unit 230.

Then, the path evaluation unit 220 transmits the path evaluation data in which the evaluation value has been given to the path adjustment device 300. Thereafter, the path reception unit 310 of the path adjustment device 300 receives the path evaluation data in which the evaluation value has been given by the business operator or the like, and the path learning unit 330 adds the path evaluation data in which the evaluation value has been given to learning data to learn the utility function.

The path reception unit 310, the path learning unit 330, the multi-path optimization unit 350, the path transmission unit 360, and the business operator registration reception unit 380 are implemented using a processor (for example, a central processing unit (CPU) or a graphics processing unit (GPU)) of a computer that operates according to a program (path adjustment program).

For example, the program may be stored in a storage unit (not illustrated) of the path adjustment device 300, the processor may read the program and operate as the path reception unit 310, the path learning unit 330, the multi-path optimization unit 350, the path transmission unit 360, and the business operator registration reception unit 380 according to the program. In addition, the respective functions of the path reception unit 310, the path learning unit 330, the multi-path optimization unit 350, the path transmission unit 360, and the business operator registration reception unit 380 may be provided in the form of software as a service (SaaS).

In addition, each of the path reception unit 310, the path learning unit 330, the multi-path optimization unit 350, the path transmission unit 360, and the business operator registration reception unit 380 may be implemented using dedicated hardware. In addition, some or all of constituent elements of each device may be implemented using a general-purpose or dedicated circuit (circuitry), a processor, or a combination thereof. These may be configured by a single chip, or may be configured by a plurality of chips connected via a bus. Some or all of constituent elements of each device may be implemented using a combination of the above-described circuits and the like and a program.

In addition, when some or all of constituent elements of each of the path reception unit 310, the path learning unit 330, the multi-path optimization unit 350, the path transmission unit 360 and the business operator registration reception unit 380 are implemented using a plurality of information processing devices, circuits, and the like, the plurality of information processing devices, circuits, and the like may be arranged to be centralized or arranged to be distributed. For example, the information processing devices, circuits, and the like may be implemented in the form of being connected via a communication network such as a client server system and a cloud computing system.

Figure 10:
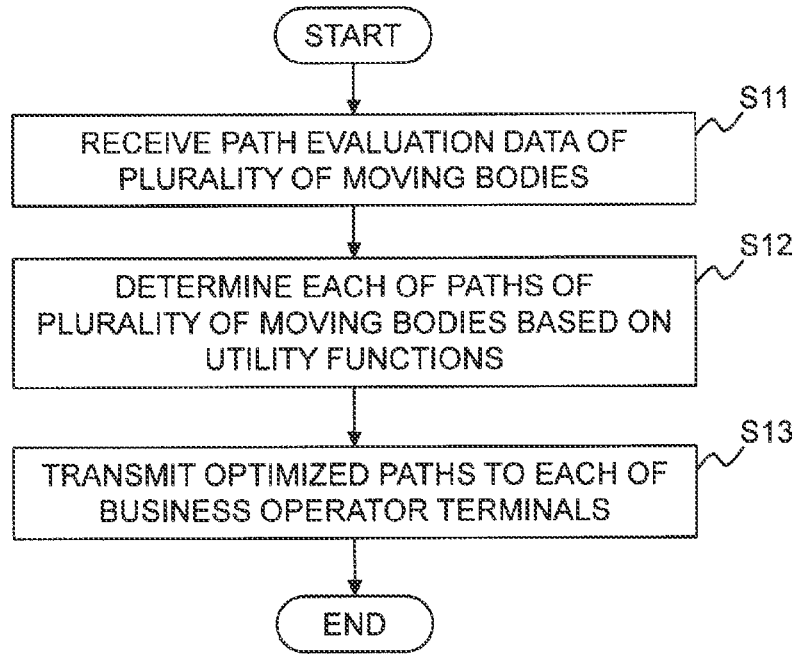
FIG. 10
It depicts a flowchart illustrating an operation example of the path adjustment system.

Next, an operation of the path adjustment system of the present exemplary embodiment will be described. FIG. 10 is an explanatory diagram illustrating an operation example of the path adjustment system of the present exemplary embodiment. The path reception unit 310 receives path evaluation data of a plurality of moving bodies (Step S11). The multi-path optimization unit 350 determines paths of the plurality of moving bodies based on the utility function (Step S12). Then, the path transmission unit 360 transmits an optimized path to each of the business operator terminals 200 (Step S13).

As described above, in the present exemplary embodiment, the path reception unit 310 receives the path evaluation data of the plurality of moving bodies, the multi-path optimization unit 350 determines the paths of the plurality of moving bodies based on the utility function, and the path transmission unit 360 transmits each optimized path (for example, to each of the business operator terminals 200). Accordingly, the path that is highly convenient for the administrator can be provided so as not to collide with other moving bodies while reducing the amount of data that the administrator needs to declare for the paths of the moving bodies.

Specifically, a first effect in the present exemplary embodiment is that the amount of data declared by the business operator can be suppressed. A reason thereof is that the path adjustment device 300 estimates the utility for the path of each business operator, and thus, information can be interpolated even if data is insufficient. In addition, a second effect is that it is unnecessary for each business operator to determine a path in consideration of interference with other business operators. A reason thereof is that the path adjustment device 300 estimates a true utility function of each business operator and adjusts paths between the business operators.

Figure 11:
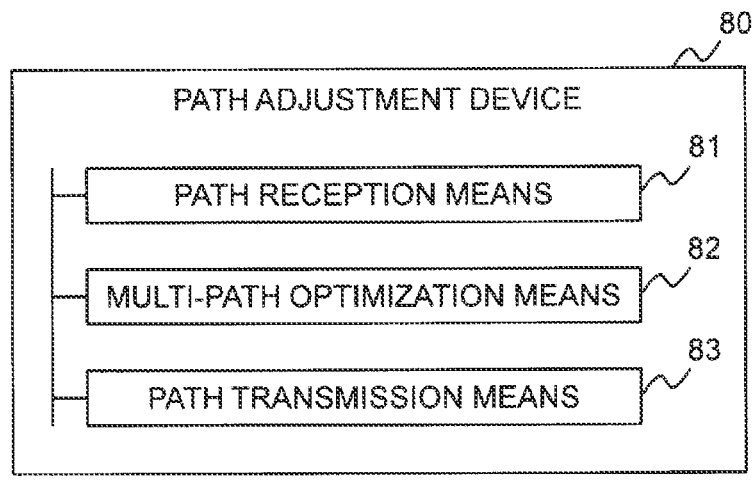
FIG. 11
It depicts a block diagram illustrating an outline of the path adjustment device according to the present invention.

Next, an outline of the present invention will be described. FIG. 11 is a block diagram illustrating an outline of the path adjustment device according to the present invention. A path adjustment device 80 (for example, the path adjustment device 300) according to the present invention includes: a path reception means 81 (for example, the path reception unit 310) for receiving path evaluation data including each of paths of a plurality of moving bodies and an evaluation value of a business operator (in addition, for example, a pilot, an administrator, or the like) for each of the paths; a multi-path optimization means 82 (for example, the multi-path optimization unit 350) for performing optimization based on a utility function representing adequacy of the business operator for the path learned based on the path evaluation data such that the number of moving bodies existing in the identical area is a predetermined number or less (for example, one) (that is, so as not to collide) and determining each of the paths of the plurality of moving bodies to adjust the paths of the plurality of moving bodies; and a path transmission means 83 (for example, the path transmission unit 360) for transmitting each optimized path.

With such a configuration, the path that is highly convenient for the administrator can be provided so as not to collide with other moving bodies while reducing the amount of data that the administrator needs to declare for the paths of the moving bodies.

In addition, the path adjustment device 80 may include a path learning means (for example, the path learning unit 330) for learning a utility function for each moving body based on the path evaluation data for each moving body. Then, the multi-path optimization means 82 may determine each of the paths of the plurality of moving bodies based on the learned utility function.

At this time, the path reception means 81 may receive the path evaluation data in which an evaluation value has been given to a path transmitted to each moving body (for example, by a business operator, an administrator, or the like). Then, the path learning means may learn the utility function using the path evaluation data in which the evaluation value has been given.

Specifically, the path learning means may learn the utility function using a kernel function that evaluates the closeness of one path to another path.

The multi-path optimization means 82 may represent a path of a moving body as a set of use or non-use of small areas in space-time, causes the use or non-use of the small areas to result in mixed integer programming problems to determine space-time to be used by each moving body.

In addition, the multi-path optimization means 82 may determine each of the paths of the moving bodies by generating the path of the moving body so as to maximize the utility function based on a tree structure (for example, CT) in which a node includes a collision between the plurality of moving bodies as a constraint on the path of the moving body.

Note that the path learning means described above may regress the utility function in a Gaussian process. Then, the multi-path optimization means 82 may generate a new path that has not been transmitted to each moving body based on a statistical value (for example, an average value, a variance, entropy, or the like) calculated based on the utility function.

In addition, the path adjustment device 80 may include a utility function acquisition means (for example, the business operator registration reception unit 380) for acquiring a corresponding utility function from attribute information representing an attribute of a new business operator or flight information based on a correspondence between the attribute information representing an attribute of a business operator of a moving body or an attribute of a flight plan of the moving body and a utility function of the moving body.

Figure 12:
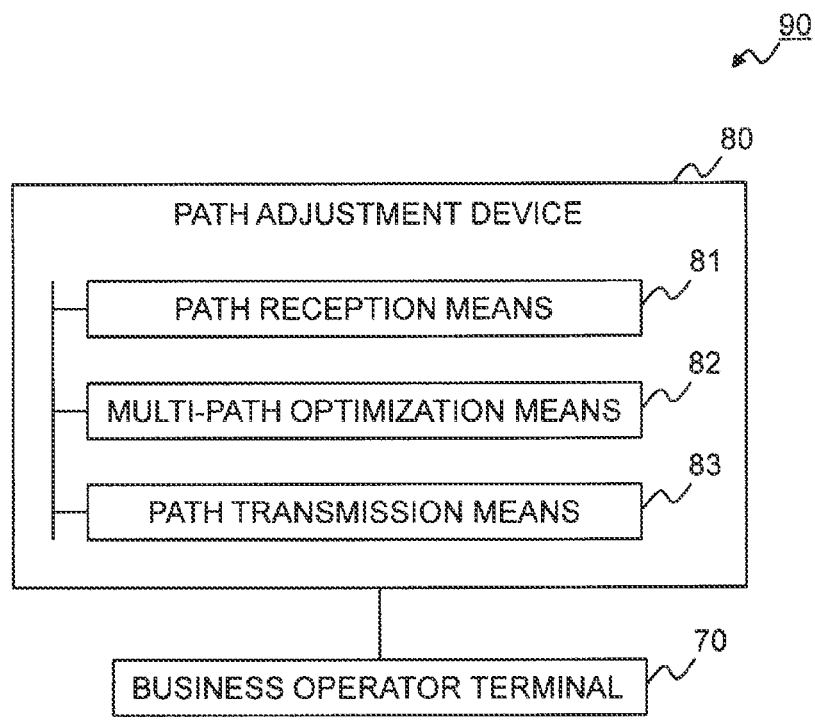
FIG. 12
It depicts a block diagram illustrating an outline of the path adjustment system according to the present invention.

FIG. 12 is a block diagram illustrating an outline of the path adjustment system according to the present invention. A path adjustment system 90 (for example, the path adjustment system 100) according to the present invention includes: the path adjustment device 80 (for example, the path adjustment device 300) that adjusts the paths of the plurality of moving bodies; and one or more business operator terminals 70 (for example, business operator terminals 200). Note that a configuration of the path adjustment device 80 is similar to that of the path adjustment device 80 illustrated in FIG. 11.

Even with such a configuration, the path that is highly convenient for the administrator can be provided so as not to collide with other moving bodies while reducing the amount of data that the administrator needs to declare for the paths of the moving bodies.

In addition, the business operator terminal 70 may include a path evaluation means (for example, the path evaluation unit 220) for evaluating the adequacy of the received path.

Specifically, the path evaluation means may receive input of an evaluation value of the received path.

In addition, the path evaluation means may evaluate the adequacy of the path based on an evaluation condition.

Figure 13:
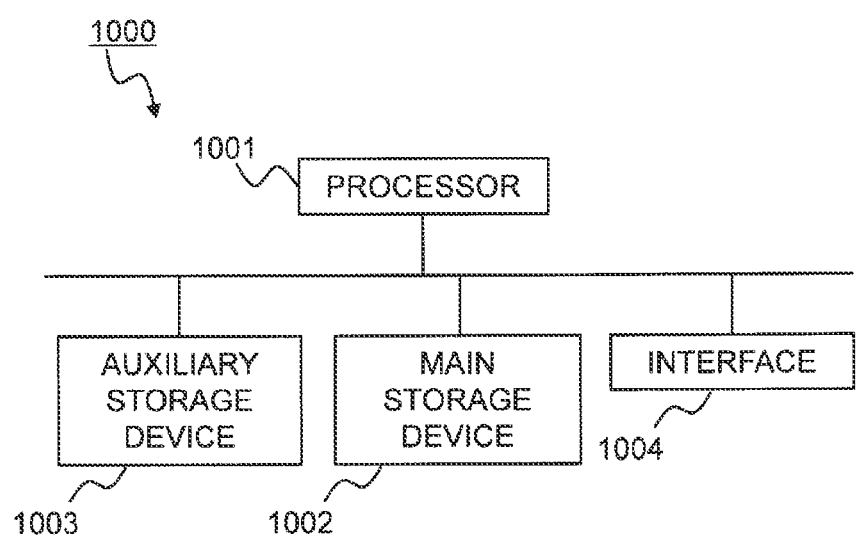
FIG. 13
It depicts a schematic block diagram illustrating a configuration of a computer according to at least one exemplary embodiment.

FIG. 13 is a schematic block diagram illustrating a configuration of a computer according to at least one exemplary embodiment. A computer 1000 is provided with a processor 1001, a main storage device 1002, an auxiliary storage device 1003, and an interface 1004.

The path adjustment device 80 described above is mounted on the computer 1000. Then, the operation of each processing unit described above is stored in the auxiliary storage device 1003 in the form of a program (path adjustment program). The processor 1001 reads out the program from the auxiliary storage device 1003 and expands the program into the main storage device 1002 to execute the above-described processes according to the program.

Note that the auxiliary storage device 1003 is an example of a non-transitory tangible medium in at least one exemplary embodiment. Other examples of the non-transitory tangible medium include a magnetic disk connected via the interface 1004, a magneto-optical disk, a compact disc read-only memory (CD-ROM), a DVD-ROM (read-only memory), a semiconductor memory, and the like. In addition, when the program is distributed to the computer 1000 via a communication line, the computer 1000 may expand this program into the main storage device 1002 and execute the above-described processes in response to the distribution.

In addition, the program may be configured to implement some of the above-described functions. In addition, the program may serve as one which implements the above-described functions in combination with other programs that have been already stored in the auxiliary storage device 1003, that is, a so-called difference file (difference program).

The some or all of the exemplary embodiments disclosed above can be described also as the following supplementary notes, but are not limited thereto.

(Supplementary note 1) A path adjustment device including:
a path reception means for receiving path evaluation data including each of paths of a plurality of moving bodies and evaluation values of business operators for each of the paths;
a multi-path optimization means for performing optimization based on a utility function that represents adequacy of a business operator for a path learned based on the path evaluation data such that a number of the moving bodies existing in an identical area is a predetermined number or less and determining each of the paths of the plurality of moving bodies to adjust the paths of the plurality of moving bodies; and
a path transmission means for transmitting each optimized path.

(Supplementary note 2) The path adjustment device according to Supplementary note 1, further including
a path learning means for learning a utility function for each of the moving bodies based on the path evaluation data for each of the moving bodies,
in which the multi-path optimization means determines each of the paths of the plurality of moving bodies based on the learned utility function.

(Supplementary note 3) The path adjustment device according to Supplementary note 2, in which
the path reception means receives path evaluation data in which an evaluation value is given to a path transmitted to each of the moving bodies, and
the path learning means learns a utility function using the path evaluation data in which the evaluation value is given.

(Supplementary note 4) The path adjustment device according to Supplementary note 2 or 3, in which
the path learning means learns a utility function using a kernel function that evaluates closeness of one path to another path.

(Supplementary note 5) The path adjustment device according to any one of Supplementary notes 1 to 4, in which
the multi-path optimization means represents a path of a moving body as a set of use or non-use of small areas in space-time and causes the use or non-use of the small areas to result in mixed integer programming problems to determine space-time to be used by each of the moving bodies.

(Supplementary note 6) The path adjustment device according to any one of Supplementary notes 1 to 4, in which
the multi-path optimization means determines each of the paths of the moving bodies by generating a path of a moving body so as to maximize a utility function based on a tree structure in which a node includes a collision between the plurality of moving bodies as a constraint on the path of the moving body.

(Supplementary note 7) The path adjustment device according to any one of Supplementary notes 2 to 4, in which
the path learning means regresses a utility function in a Gaussian process, and
the multi-path optimization means generates a new path, which has not been transmitted to each of the moving bodies, based on a statistical value calculated based on the utility function.

(Supplementary note 8) The path adjustment device according to any one of Supplementary notes 1 to 7, further including
a utility function acquisition means for acquiring a corresponding utility function from attribute information representing an attribute of a new business operator or flight information based on a correspondence between the attribute information representing an attribute of a business operator of a moving body or an attribute of a flight plan of the moving body and a utility function of the moving body.

(Supplementary note 9) A path adjustment system including:
a path adjustment device that adjusts paths of a plurality of moving bodies; and
one or more business operator terminals,
in which the path adjustment device includes:
a path reception means for receiving path evaluation data including each of paths of the moving bodies and evaluation values of business operators for each of the paths from the business operator terminals;
a multi-path optimization means for performing optimization based on a utility function that represents adequacy of a business operator for a path learned based on the path evaluation data such that a number of the moving bodies existing in an identical area is a predetermined number or less and determining each of the paths of the plurality of moving bodies; and
a path transmission means for transmitting an optimized path to the business operator terminal.

(Supplementary note 10) The path adjustment system according to Supplementary note 9, in which
the business operator terminal includes a path evaluation means for evaluating adequacy of the received path.

(Supplementary note 11) The path adjustment system according to Supplementary note 10, in which
the path evaluation means receives input of an evaluation value of the received path.

(Supplementary note 12) The path adjustment system according to Supplementary note 10 or 11, in which
the path evaluation means evaluates the adequacy of the path based on an evaluation condition.

(Supplementary note 13) A path adjustment method including:
receiving path evaluation data including each of paths of a plurality of moving bodies and evaluation values of business operators for each of the paths;
performing optimization based on a utility function that represents adequacy of a business operator for a path learned based on the path evaluation data such that a number of the moving bodies existing in an identical area is a predetermined number or less and determining each of the paths of the plurality of moving bodies to adjust the paths of the plurality of moving bodies; and
transmitting each optimized path.

(Supplementary note 14) The path adjustment method according to Supplementary note 13, further including:
learning a utility function for each of the moving bodies based on the path evaluation data for each of the moving bodies; and
determining each of the paths of the plurality of moving bodies based on the learned utility function.

(Supplementary note 15) A program storage medium storing a path adjustment program that causes a computer to execute:
a path reception process of receiving path evaluation data including each of paths of a plurality of moving bodies and evaluation values of business operators for each of the paths;
a multi-path optimization process of performing optimization based on a utility function that represents adequacy of a business operator for a path learned based on the path evaluation data such that a number of the moving bodies existing in an identical area is a predetermined number or less and determining each of the paths of the plurality of moving bodies to adjust the paths of the plurality of moving bodies; and
a path transmission process of transmitting each optimized path.

(Supplementary note 16) The program storage medium according to Supplementary note 15 storing a path adjustment program that causes a computer to execute
a path learning process of learning a utility function for each of the moving bodies based on the path evaluation data for each of the moving bodies,
in which each of the paths of the plurality of moving bodies is determined based on the learned utility function in the multi-path optimization process.

(Supplementary note 17) A path adjustment program that causes a computer to execute:
a path reception process of receiving path evaluation data including each of paths of a plurality of moving bodies and evaluation values of business operators for each of the paths;
a multi-path optimization process of performing optimization based on a utility function that represents adequacy of a business operator for a path learned based on the path evaluation data such that a number of the moving bodies existing in an identical area is a predetermined number or less and determining each of the paths of the plurality of moving bodies to adjust the paths of the plurality of moving bodies; and
a path transmission process of transmitting each optimized path.

(Supplementary note 18) The path adjustment program according to Supplementary note 17 that causes a computer to execute
a path learning process of learning a utility function for each of the moving bodies based on the path evaluation data for each of the moving bodies,
in which each of the paths of the plurality of moving bodies is determined based on the learned utility function in the multi-path optimization process.

As above, the invention of the present application has been described with reference to the exemplary embodiments, but the invention of the present application is not limited to the above-described exemplary embodiments. Various modifications that can be understood by the person skilled in the art can be made within a scope of the invention of the present application regarding the configuration and the details of the invention of the present application.

REFERENCE SIGNS LIST

100 Path adjustment system
110, 120, 130 Moving body
200 Business operator terminal 210 Path generation unit
220 Path evaluation unit
230 Path evaluation setting unit
240 Path evaluation display unit
300 Path adjustment device
310 Path reception unit
320 Path evaluation storage unit
330 Path learning unit
340 Path utility model storage unit
350 Multi-path optimization unit
360 Path transmission unit
370 Business operator attribute path utility model storage unit
380 Business operator registration reception unit

What is claimed is:

1. A path adjustment device comprising a hardware processor configured to execute a software code to:
receive path evaluation data including each of paths of a plurality of moving bodies and evaluation values of business operators for each of the paths;
learn a utility function for each of the moving bodies based on the path evaluation data for each of the moving bodies; and
determine each of the paths of the plurality of moving bodies based on the learned utility function;
perform optimization based on a utility function that represents adequacy of a business operator for a path learned based on the path evaluation data such that a number of the moving bodies existing in an identical area is a predetermined number or less and determines each of the paths of the plurality of moving bodies to adjust the paths of the plurality of moving bodies; and
transmit each optimized path; and
control the moving bodies to move based on said each optimized path,
wherein receiving the path evaluation data comprises receiving the path evaluation data from each of the moving bodies.

2. The path adjustment device according to claim 1, wherein the hardware processor is configured to execute a software code to:
receive path evaluation data in which an evaluation value is given to a path transmitted to each of the moving bodies; and
learn a utility function using the path evaluation data in which the evaluation value is given.

3. The path adjustment device according to claim 1, wherein the hardware processor is configured to execute a software code to
learn a utility function using a kernel function that evaluates closeness of one path to another path.

4. The path adjustment device according to claim 1, wherein the hardware processor is configured to execute a software code to
represent a path of a moving body as a set of use or non-use of small areas in space-time and cause the use or non-use of the small areas to result in mixed integer programming problems to determine space-time to be used by each of the moving bodies.

5. The path adjustment device according to claim 1, wherein the hardware processor is configured to execute a software code to
determine each of the paths of the moving bodies by generating a path of a moving body so as to maximize a utility function based on a tree structure in which a node includes a collision between the plurality of moving bodies as a constraint on the path of the moving body.

6. The path adjustment device according to claim 1, wherein the hardware processor is configured to execute a software code to:
regress a utility function in a Gaussian process; and
generate a new path, which has not been transmitted to each of the moving bodies, based on a statistical value calculated based on the utility function.

7. The path adjustment device according to claim 1, wherein the hardware processor is configured to execute a software code to
acquire a corresponding utility function from attribute information representing an attribute of a new business operator or flight information based on a correspondence between the attribute information representing an attribute of a business operator of a moving body or an attribute of a flight plan of the moving body and a utility function of the moving body.

8. A path adjustment system comprising:
a path adjustment device that adjusts paths of a plurality of moving bodies; and
one or more business operator terminals,
wherein the path adjustment device includes:
a memory storing instructions; and
at least one hardware processor configured to execute the instructions to implement:
receiving path evaluation data including each of paths of the moving bodies and evaluation values of business operators for each of the paths from the business operator terminals;
learning a utility function for each of the moving bodies based on the path evaluation data for each of the moving bodies; and
determining each of the paths of the plurality of moving bodies based on the learned utility function;
performing optimization based on a utility function that represents adequacy of a business operator for a path learned based on the path evaluation data such that a number of the moving bodies existing in an identical area is a predetermined number or less and determines each of the paths of the plurality of moving bodies;
transmitting an optimized path to the business operator terminal; and
controlling the moving bodies to move based on the optimized path,
wherein receiving the path evaluation data comprises receiving the path evaluation data from each of the moving bodies.

9. The path adjustment system according to claim 8, wherein
the business operator terminal is configured to evaluate an adequacy of the received path.

10. The path adjustment system according to claim 9, wherein
the business operator terminal is further configured to receive an input of an evaluation value of the received path.

11. The path adjustment system according to claim 9, wherein
the business operator terminal is further configured to receive the adequacy of the path based on an evaluation condition.

12. A path adjustment method comprising:
- receiving path evaluation data including each of paths of a plurality of moving bodies and evaluation values of business operators for each of the paths;
- learning a utility function for each of the moving bodies based on the path evaluation data for each of the moving bodies; and
- determining each of the paths of the plurality of moving bodies based on the learned utility function;
- performing optimization based on a utility function that represents adequacy of a business operator for a path learned based on the path evaluation data such that a number of the moving bodies existing in an identical area is a predetermined number or less and determining each of the paths of the plurality of moving bodies to adjust the paths of the plurality of moving bodies; and
- transmitting each optimized path.

* * * * *